US010707567B2

(12) United States Patent
Grimes et al.

(10) Patent No.: US 10,707,567 B2
(45) Date of Patent: Jul. 7, 2020

(54) ANTENNA MODULE FOR A MOTOR VEHICLE, DRIVER ASSISTANCE SYSTEM AS WELL AS MOTOR VEHICLE (71) Applicant: Connaught Electronics Ltd., Tuam, County Galway (IE)

(72) Inventors: Carol Grimes, Galway (IE); Colin Patrick Hehir, Galway (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 59 days.

(21) Appl. No.: 15/411,011

(22) Filed: Jan. 20, 2017

(65) Prior Publication Data

US 2017/0214130 A1  Jul. 27, 2017

(30) Foreign Application Priority Data

Jan. 21, 2016  (DE) .......................... 10 2016 100 985

(51) Int. Cl.
*H01Q 1/32* (2006.01)
*B60R 11/04* (2006.01)
(Continued)

(52) U.S. Cl.
CPC .......... *H01Q 1/3275* (2013.01); *B60R 11/04* (2013.01); *H01Q 1/1214* (2013.01);
(Continued)

(58) Field of Classification Search
CPC ...... H01Q 1/3275; H01Q 1/32; H01Q 1/3283; B60R 11/04
See application file for complete search history.

(56) References Cited

U.S. PATENT DOCUMENTS 5,793,420 A * 8/1998 Schmidt .................. B60R 1/00
340/433
7,057,500 B1 * 6/2006 Belloso ................... B60R 1/00
340/425.5
(Continued)

FOREIGN PATENT DOCUMENTS

CN   104979631 A  * 10/2015
CN   104979631 A  * 10/2015
(Continued)

OTHER PUBLICATIONS

Office Action in corresponding European Application No. EP 17701831.4, dated Feb. 18, 2020 (9 pages).

*Primary Examiner* — Ab Salam Alkassim, Jr.
(74) *Attorney, Agent, or Firm* — Osha Liang LLP (57) ABSTRACT The invention relates to an antenna module (3) for a motor vehicle (1) comprising at least one antenna (5, 5a, 5b, 5c) for an infotainment system of the motor vehicle (1), an antenna housing (6) for attaching to an exterior trim part (4) of the motor vehicle (1) and a camera (7) with a camera objective (10) for capturing an environmental region (8) of the motor vehicle (1), wherein the at least one antenna (5, 5a, 5b, 5c) is disposed in an interior of the antenna housing (6), wherein the camera (7) is disposed in the interior of the antenna housing (6) in certain areas, wherein the camera objective (10) is disposed in a passage opening (25) of a housing wall (26) of the antenna housing (6) corresponding to the camera objective (10) at least in certain areas, and the antenna module (3) comprises a sealing element (27) for sealing a gap between the housing wall (26) adjoining to the passage opening (25) and the camera objective (10). The invention additionally relates to a driver assistance system (2) as well as to a motor vehicle (1).

13 Claims, 6 Drawing Sheets (51) Int. Cl.
  *H01Q 1/12* (2006.01)
  *H01Q 1/42* (2006.01)
  *B60R 11/00* (2006.01)

(52) U.S. Cl.
  CPC ...... *H01Q 1/3283* (2013.01); *B60R 2011/004* (2013.01); *H01Q 1/42* (2013.01)

(56) References Cited

U.S. PATENT DOCUMENTS

| | | | | |
|---|---|---|---|---|
| 9,205,785 | B2* | 12/2015 | Squire | B60R 11/04 |
| 9,674,414 | B1* | 6/2017 | Molin | H04N 5/2254 |
| 2006/0171704 | A1* | 8/2006 | Bingle | B60R 11/04 |
| | | | | 396/419 |
| 2009/0122141 | A1* | 5/2009 | Nakamura | B60R 11/04 |
| | | | | 348/148 |
| 2010/0129070 | A1* | 5/2010 | Balasundaramohan | |
| | | | | G03B 17/00 |
| | | | | 396/419 |
| 2012/0277337 | A1* | 11/2012 | Kawata | C08J 3/24 |
| | | | | 521/150 |
| 2012/0327234 | A1* | 12/2012 | Fish, Jr. | B60R 11/04 |
| | | | | 348/148 |
| 2014/0060582 | A1* | 3/2014 | Hartranft | B60R 11/04 |
| | | | | 134/18 |
| 2014/0158731 | A1* | 6/2014 | Squire | B60R 11/04 |
| | | | | 224/545 |
| 2016/0191863 | A1* | 6/2016 | Minikey, Jr. | H04N 5/2254 |
| | | | | 348/148 |
| 2017/0033449 | A1* | 2/2017 | Talty | H01Q 1/3275 |
| 2017/0129419 | A1* | 5/2017 | Conger | B60R 11/04 |
| 2017/0136959 | A1* | 5/2017 | Denny | B60R 11/0205 |
| 2017/0257535 | A1* | 9/2017 | Minikey, Jr. | B60R 11/04 |
| 2018/0076514 | A1* | 3/2018 | Nugent | H01Q 1/42 |
| 2018/0261912 | A1* | 9/2018 | Mizuno | H01Q 1/32 |
| 2018/0284573 | A1* | 10/2018 | Cammenga | G03B 11/041 |
| 2019/0036198 | A1* | 1/2019 | Mizuno | H01Q 1/22 |
| 2019/0237866 | A1* | 8/2019 | Kiyokawa | H01Q 1/32 |
| 2019/0260916 | A1* | 8/2019 | Kimura | B60R 16/00 |
| 2020/0059585 | A1* | 2/2020 | Wang | H04N 5/2254 |

FOREIGN PATENT DOCUMENTS

| | | | | |
|---|---|---|---|---|
| DE | 102010064080 | A1 | 6/2012 | |
| DE | 102015210449 | A1 * | 12/2016 | ............. B60R 11/04 |
| KR | 20110004565 | U * | 5/2011 | |
| KR | 101052796 | B1 * | 7/2011 | |
| KR | 20120000680 | U | 2/2012 | |
| KR | 101134305 | B1 * | 4/2012 | |
| KR | 101155607 | B1 * | 6/2012 | |
| KR | 101251979 | B1 * | 4/2013 | |
| KR | 101251979 | B1 * | 4/2013 | |
| WO | WO 2015164596 | A2 * | 10/2015 | ............. B06R 11/04 |
| WO | WO-2015164596 | A2 * | 10/2015 | ............. B60R 11/04 |

* cited by examiner

ANTENNA MODULE FOR A MOTOR VEHICLE, DRIVER ASSISTANCE SYSTEM AS WELL AS MOTOR VEHICLE

The invention relates to an antenna module for a motor vehicle comprising at least one antenna for an infotainment system of the motor vehicle, an antenna housing for attaching to an exterior trim part of the motor vehicle and a camera with a camera objective for capturing an environmental region of the motor vehicle, wherein the at least one antenna is disposed in an interior of the antenna housing. In addition, the invention relates to a driver assistance system with an antenna module as well as to a motor vehicle with a driver assistance system.

Camera-based driver assistance systems for motor vehicles, for example for monitoring an environmental region of the motor vehicle, are already known from the prior art. Therein, cameras are attached to exterior trim parts of the motor vehicle for example to capture the environmental region of the motor vehicle in images. The images representing the environmental region, captured by the cameras can be provided to the driver assistance system of the motor vehicle. In order to particularly inexpensively configure such a driver assistance system, in DE 10 2010 064 080 A1, it is disclosed to integrate the camera in a roof antenna of the motor vehicle. Such a roof antenna can for example be a shark fin antenna, in the antenna housing of which the camera and the antenna are integrated. Thus, additional installation locations for the camera, for example on bumpers of the motor vehicle, can be avoided.

However, in such cameras attached to exterior trim parts, so-called exterior cameras, it is problematic that they are exposed to environmental influences, in particular environmental influences caused by weather, for example moisture by rain or snow. In order to ensure high functionality of these exterior cameras, such cameras are expensively and cost-Intensively formed as water-proof cameras according to the prior art.

It is the object of the present invention to provide a solution, how a highly integrated camera can be particularly simply and reliably protected from environmental influences such that high functionality can be ensured for the camera.

According to the invention, this object is solved by an antenna module, a driver assistance system as well as a motor vehicle according to the independent claims. Advantageous embodiments of the invention are the subject matter of the dependent claims, of the description and of the figures.

An antenna module according to the invention for a motor vehicle comprises at least one antenna for an infotainment system of the motor vehicle, an antenna housing for attaching to an exterior trim part of the motor vehicle and a camera with a camera objective for capturing an environmental region of the motor vehicle. The at least one antenna is disposed in an interior of the antenna housing. Moreover, the camera is disposed in the interior of the antenna housing in certain areas, wherein the camera objective is disposed in a passage opening of a housing wall of the antenna housing corresponding to the camera objective at least in certain areas. In addition, the antenna module comprises a sealing element for sealing a gap between the housing wall adjoining to the passage opening and the camera objective.

By means of the at least one antenna of the antenna module, signals for the infotainment system of the motor vehicle can be emitted and/or received. The infotainment system can for example be a car radio and/or a navigation system and/or a driver assistance system, which for example performs assistance functions based on vehicle data emitted and/or received via car-to-car communication (Car2Car communication). Thereto, the antenna module can for example have a radio antenna and/or a GPS antenna and/or an antenna for the car-to-car communication as the at least one antenna. The at least one antenna is in particular completely disposed in the antenna housing, wherein the antenna housing forms a radome for the at least one antenna at least in certain areas. The antenna housing can for example be attached to a roof of the motor vehicle.

In addition, the camera with the camera objective is integrated in the antenna housing. In order to be able to capture the environmental region of the motor vehicle, the antenna housing has the passage opening corresponding to the camera objective. Therein, the passage opening is formed as a hole in the housing wall of the antenna housing, in which the camera objective is disposed at least in certain areas such that a lens disposed at the front side on the camera objective faces the environmental region or is formed adjoining to the environmental region. Thus, the camera is disposed such that the camera objective is inserted into the passage opening from the interior of the antenna housing. Electronics of the camera, for example an image sensor and electronic components for image processing, is in particular completely disposed in the interior of the antenna housing. Viewed from the environmental region, thus, only the camera objective, in particular only the lens of the camera objective, is visible.

Now, in order to prevent for example moisture from penetrating into the interior of the antenna housing, the antenna module has the sealing element. The sealing element is disposed on and/or in the gap or the joint, which is formed between the housing wall adjoining to the passage opening and an outer side of the camera objective. With a cylindrical camera objective, the passage opening corresponding thereto is in particular formed as a round hole. The gap between the outer side of the camera objective and the housing wall adjoining to the passage opening is therefore for example annularly formed. Thus, the gap in particular completely surrounds an outer circumference of the camera objective. Starting from the lens, the sealing element is disposed in and/or on the gap in radial direction. The housing wall is formed adjoining to the sealing element in radial direction. Thus, the sealing element closes the gap and thus prevents penetration of moisture into the interior of the antenna housing.

Thereby, in particular the electronics of the camera disposed in the interior can be advantageously prevented from damage by moisture. Thus, the camera does not have to be formed as a water-proof camera in expensive and cost-intensive manner. The antenna housing itself also does not have to be expensively formed in water-proof manner, for example by providing an optically transparent cover in the area of the camera. By the sealing element, the sealing of the antenna housing can be achieved in simple and inexpensive manner.

It proves advantageous if the sealing element comprises an elastic material and is pressed into the gap between the housing wall adjoining to the passage opening and the camera objective. In particular, the sealing element is completely formed of the elastic material. The sealing element is compressed in the gap by the camera objective and the housing wall adjoining to the passage opening and thus closes the gap surrounding the objective. Thus, the sealing element is formed adjoining to an outer side of the objective and adjoining to the housing wall surrounding the passage opening. By the pressed-in sealing element, the camera objective can additionally be retained in the passage opening.

Preferably, the sealing element comprises ethylene propylene diene rubber as the elastic material. Ethylene propylene diene rubber, briefly EPDM, has a particularly high weather and ozone resistance as well as high thermal resistance and therefore is particularly well suited for the sealing element for sealing the camera housing. In addition, sealing elements of EPDM can be particularly inexpensively produced in high number of pieces. Thus, the antenna module can be sealed in particularly simple manner. Alternately the sealing element comprises nitrile-butadiene rubber (NBR) or hydrogenated nitrile-butadiene rubber (HNBR) or liquid silicone rubber (LSR) or fluoroelastomer (FPM/FKM).

In an advantageous embodiment of the invention, the sealing element is hollow cylindrically formed. In particular, an internal diameter of the hollow cylindrical sealing element is between 10 mm and 20 mm, in particular 15 mm. The hollow cylindrical sealing element is therefore in particular adapted to a camera with a lens diameter or objective diameter of 15 mm. Thus, the in particular annular gap between the camera objective and the housing wall adjoining to the passage opening can be sealed along the outer circumference of the camera objective by means of the hollow cylindrical sealing element by pressing the hollow cylindrical sealing element into the gap. Thus, the gap is completely filed and therefore sealed in a circumferential direction extending along the outer circumference of the objective.

According to a development of the invention, an objective tube of the camera objective is disposed within the hollow cylindrical sealing element, wherein the hollow cylindrical sealing element covers the objective tube along a length of the objective tube at least in certain areas. An outer side of the objective tube is therefore completely covered in circumferential direction and covered along the length of the objective tube at least in certain areas. In particular, the sealing element has a length, which corresponds to the length of the objective tube. The sealing element can for example simply be put or pulled over the objective tube and be disposed in the passage opening together with the objective. When the objective is inserted into the passage opening, the sealing element is compressed by the objective and the housing wall and thereby clamped or pressed between the objective, in particular the objective tube, and the housing wall. Thus, a sealed antenna housing can be formed in simple manner.

According to an advantageous embodiment of the invention, the housing wall has a predetermined wall thickness at least in an area of the housing wall adjoining to the passage opening such that the passage opening is formed as a cylindrical cavity, and a length of the hollow cylindrical sealing element corresponds at least to the predetermined wall thickness of the housing wall. The housing wall can for example be reinforced in the area adjoining to the passage opening such that an interface of the cylindrical cavity between the passage opening and the housing wall forms a sealing area for disposing the sealing element. The sealing area thus extends in axial direction over the wall thickness. Therefrom, the advantage arises that the hollow cylindrical sealing element is in large-area contact with the housing wall in the sealing area and thereby a high sealing effect is achieved.

It can be provided that a lens disposed on a front side of the camera objective, a front side of the sealing element and an outer side of the antenna housing are substantially flush disposed. Otherwise stated, a transition between the outer side of the housing wall, the front side of the sealing element and the camera lens is substantially formed without barrier. Thus, it can be achieved that the camera is barely visible viewed from the environmental region. However, it can also be provided that at least the lens of the camera objective protrudes beyond the outer side of the antenna housing.

In a development of the invention, the camera comprises a camera housing with a rear housing for electronics of the camera and a front housing for retaining the camera objective, wherein the camera housing is disposed in the interior of the antenna housing. The camera housing is therefore a separate housing different from the antenna housing. In the rear housing, for example, a circuit board with an image sensor and with components for image processing can be disposed. In addition, the rear housing, which is for example prismatic formed, can have an interface for connecting to a control device of a driver assistance system on a rear side, via which the images captured by the camera can be provided to the control device. On the front side, the rear housing can be covered by the front housing. The front housing, which is also referred to as lens housing, can for example be plate-shaped formed and have a passage opening for the camera objective. The camera objective can for example be glued into the passage opening and thus be retained by the front housing. The camera housing is in particular completely disposed in the interior of the antenna housing. By the sealing element between the camera objective and the housing wall adjoining to the passage opening, the camera housing can be particularly simply formed. For example, a special sealing element does not have to be provided between the rear housing and the front housing of the camera housing to seal the camera housing itself. In other words, this means that the camera does not have to be formed as a water-proof camera. Thus, the camera can be particularly inexpensively formed.

Particularly preferably, the camera housing comprises a shielding material for shielding the electronics of the camera from radiation of the at least one antenna. The shielding material can for example be aluminum and shield the electronics of the camera from the radiation of the at least one antenna. In that a sealing element, for example an O-ring, does not have to be provided for the two-part camera housing including the rear housing and the front housing, the camera housing can thus be advantageously completely formed of the shielding material. Thus, the O-ring does not interrupt the camera housing and thereby the shielding material. Thus, the camera can be disposed in the interior of the antenna housing near the at least one antenna. The camera housing, thus the shielding material, thus completely surrounds the electronics of the camera and shields radiation of the at least one antenna from the electronics of the camera. Thereby, high functionality of the camera can be provided.

In an embodiment of the invention, the antenna housing comprises a plate-shaped pedestal for disposing on the exterior trim part and a roof-shaped cover covering the pedestal, wherein the passage opening is formed in a rear wall of the cover. The at least one antenna and the camera can be disposed or attached on the plate-shaped pedestal. For example, the plate-shaped pedestal can be disposed on the roof of the motor vehicle and attached there. In particular, the cover forms a radome for the at least one antenna and is disposed roof-shaped or dome-like on the pedestal. The antenna housing can for example be substantially tetrahedron-shaped, wherein corners of the tetrahedron-shaped antenna housing can be formed rounded and outer walls of the cover can be curved. From a rounded front tip of the pedestal, a ridge forming a top side of the antenna module can extend in rising manner. Adjoining to the rounded front tip as well as to lateral borders of the pedestal, lateral surfaces of the tetrahedron extend to the ridge, wherein the lateral surfaces can be curved. Adjoining to a rear-side border of the pedestal, a rear side of the tetrahedron-shaped antenna forming the rear wall of the antenna housing extends to the ridge. This rear wall faces a rearward environmental region of the motor vehicle in an intended installation position of the antenna module such that the camera, the objective of which is disposed in the passage opening of the rear wall of the antenna housing at least in certain areas, can capture the rearward environmental region.

Preferably, the antenna module is formed as a shark fin antenna module. In other words, this means that the roof-shaped cover of the antenna housing is formed in the shape of a shark fin. Thus, the antenna housing is particularly aerodynamically shaped.

In addition, the invention relates to a driver assistance system with an antenna module according to the invention. The images captured by the camera can be provided to the driver assistance system. The driver assistance system can for example be formed as a reversing assistant. However, it can also be provided that the driver assistance system allows so-called mirror-less driving. Thereto, the environmental region, in particular the rearward environmental region located behind the motor vehicle, is captured in images. The images are displayed on a display device of the driver assistance system, which is in particular disposed in a passenger cabin of the motor vehicle such that a driver of the motor vehicle can capture the rearward environmental region by looking at the display device.

A motor vehicle according to the invention includes a driver assistance system according to the invention. The motor vehicle is in particular formed as a passenger car. Preferably, the motor vehicle is formed without rearview mirrors. This means that rearview mirrors of the motor vehicle, for example exterior mirrors and interior mirrors of the motor vehicle, are replaced by the antenna module with the camera. The antenna module, which is preferably disposed on a roof of the motor vehicle, is therein in particular oriented such that the passage opening is formed in the rear wall of the antenna housing facing the rearward environmental region. The images of the rearward environmental region captured by the camera are presented on the display device for the driver, as already described.

The preferred embodiments presented with respect to the antenna module according to the invention and the advantages thereof correspondingly apply to the driver assistance system according to the invention as well as to the motor vehicle according to the invention.

With indications of "behind", "rearward", "lateral", "interior", "front-side", "rear-side", "top side", "radial", "axial", "circumferential direction" etc., the positions and orientations with intended use and intended arrangement of the antenna module on the motor vehicle and with an observer then standing in front of the motor vehicle and looking in the direction of the motor vehicle are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention.

Thus, implementations are also to be considered as encompassed and disposed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are also to be considered as disclosed, in particular by the explanations set out above, which extend beyond or deviate from the feature combinations set out in the relations of the claims.

Now, the invention is explained in more detail based on preferred embodiments as well as with reference to the attached drawings.

There show.

In the figures, identical as well as functionally identical elements are provided with the same reference characters.

Figure 1:
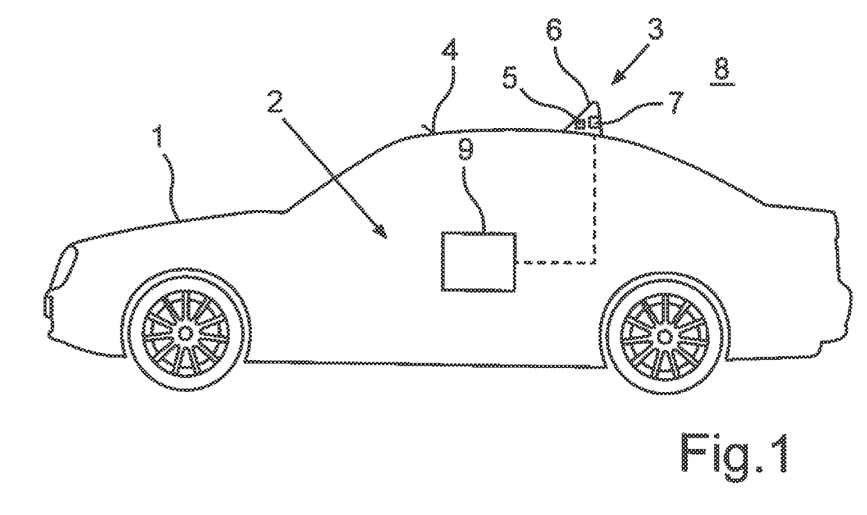
FIG. 1 a schematic illustration of an embodiment of a motor vehicle according to the invention.

FIG. 1 shows a motor vehicle 1 according to the present invention. The motor vehicle 1 is in particular formed as a passenger car. The motor vehicle 1 includes a driver assistance system 2. The driver assistance system 2 includes an antenna module 3, which is disposed on an exterior trim part 4 of the motor vehicle 1. Here, the antenna module 3 is disposed on a roof of the motor vehicle 1. The antenna module 3 includes at least one antenna 5, which emits and/or receives signals for an infotainment system of the motor vehicle 1. The infotainment system of the motor vehicle 1 can for example be a car radio, a navigation system or the like.

In addition, the antenna module 3 has an antenna housing 6, which is attached to the exterior trim part 4 for disposing the antenna module 3 on the exterior trim part 4. Here, the antenna housing 6 is formed in the shape of a shark fin. Thus, the antenna module 3 is in particular formed as a shark fin antenna module. The at least one antenna 5 is disposed in an interior of the antenna housing 6. Moreover, the antenna module 3 has a camera 7, which is disposed in the interior of the antenna housing 6 in certain areas. The camera 7 is adapted to capture an environmental region 8 of the motor vehicle 1 in images, in particular, the camera 7 captures a rearward environmental region 8 or an environmental region 8 behind the motor vehicle 1. The images captured by the camera 7 can be provided to a control device 9 of the driver assistance system 2. The control device 9 can for example be formed by a vehicle-side controller. The images captured by the camera 7 can for example be displayed on a display device of the driver assistance system 2 not illustrated here in a passenger cabin of the motor vehicle 1. Thus, rearview mirrors of the motor vehicle 1 can be replaced by the driver assistance system 2 and so-called mirror-less driving can be allowed. Thus, the motor vehicle 1 is in particular formed without rearview mirrors.

Figure 2:
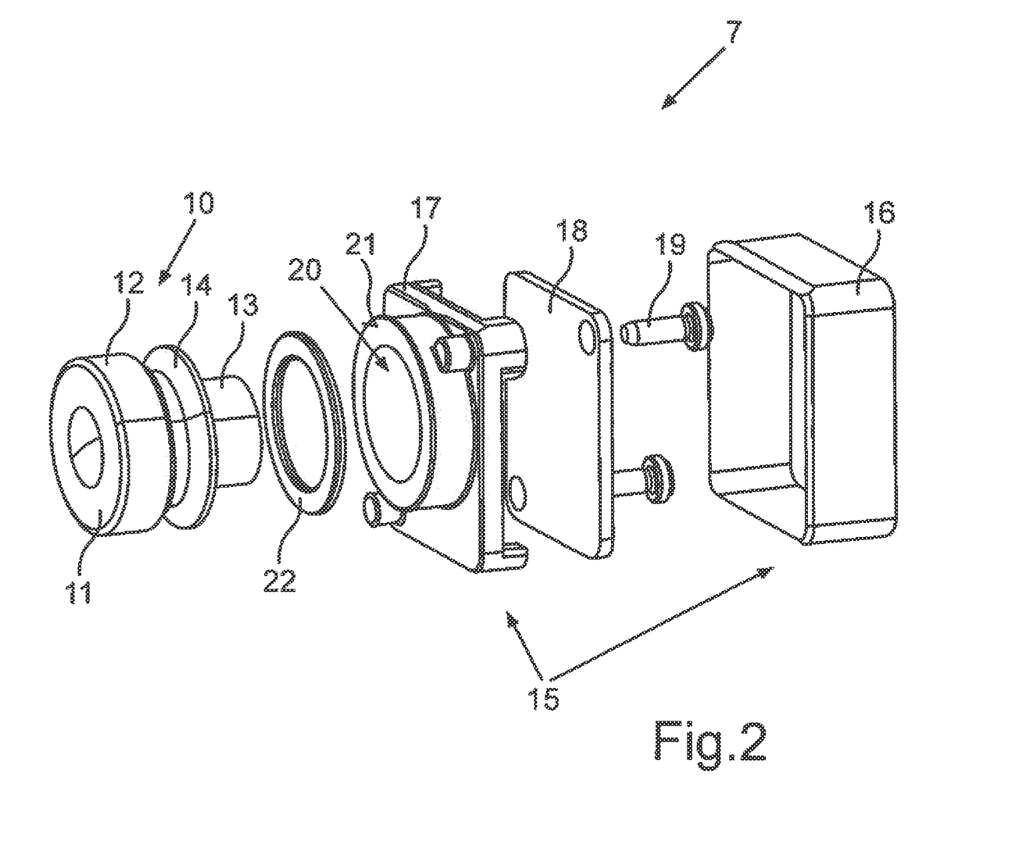
FIG. 2 a schematic illustration of a camera of an antenna module according to the Invention in an exploded representation.

FIG. 2 shows the camera 7 of the antenna module 3 in an exploded representation. The camera 7 includes a camera objective 10 with a camera lens 11 and with an objective tube 12. The objective tube 12 is in particular cylindrically formed, wherein the lens 11 is disposed on the front side on the objective tube 12. In addition, the objective 10 has a retaining element 13 as well as a cap element 14. In addition, the camera 7 includes a camera housing 15, which has a rear housing 16 as well as a front housing 17. The rear housing 16 is in particular prismatic formed and covered on the front side by the front housing 17, which is in particular plate-shaped formed. In the rear housing 16, electronics here illustrated as a circuit board 18 can be disposed. The circuit board 18 can be attached to the front housing 17 by means of fixing elements 19, for example screws. The circuit board 18 can for example have an image sensor and components for image processing of the images captured by the image sensor of the camera 7. The front housing 17 is also referred to as lens housing and serves for retaining the camera objective 10. Thereto, the front housing 17 has a passage opening 20, in which the camera objective 10 can be disposed in certain areas. In particular, the retaining element 13 is disposed in the passage opening 20 such that the cap element 14 rests on a border 21 of the passage opening 20. The cap element 14 can be attached to the border 21 of the passage opening 20 by means of an adhesive 22 such that the objective 10 is retained on the front housing 17 and thereby on the camera housing 15.

Figure 3:
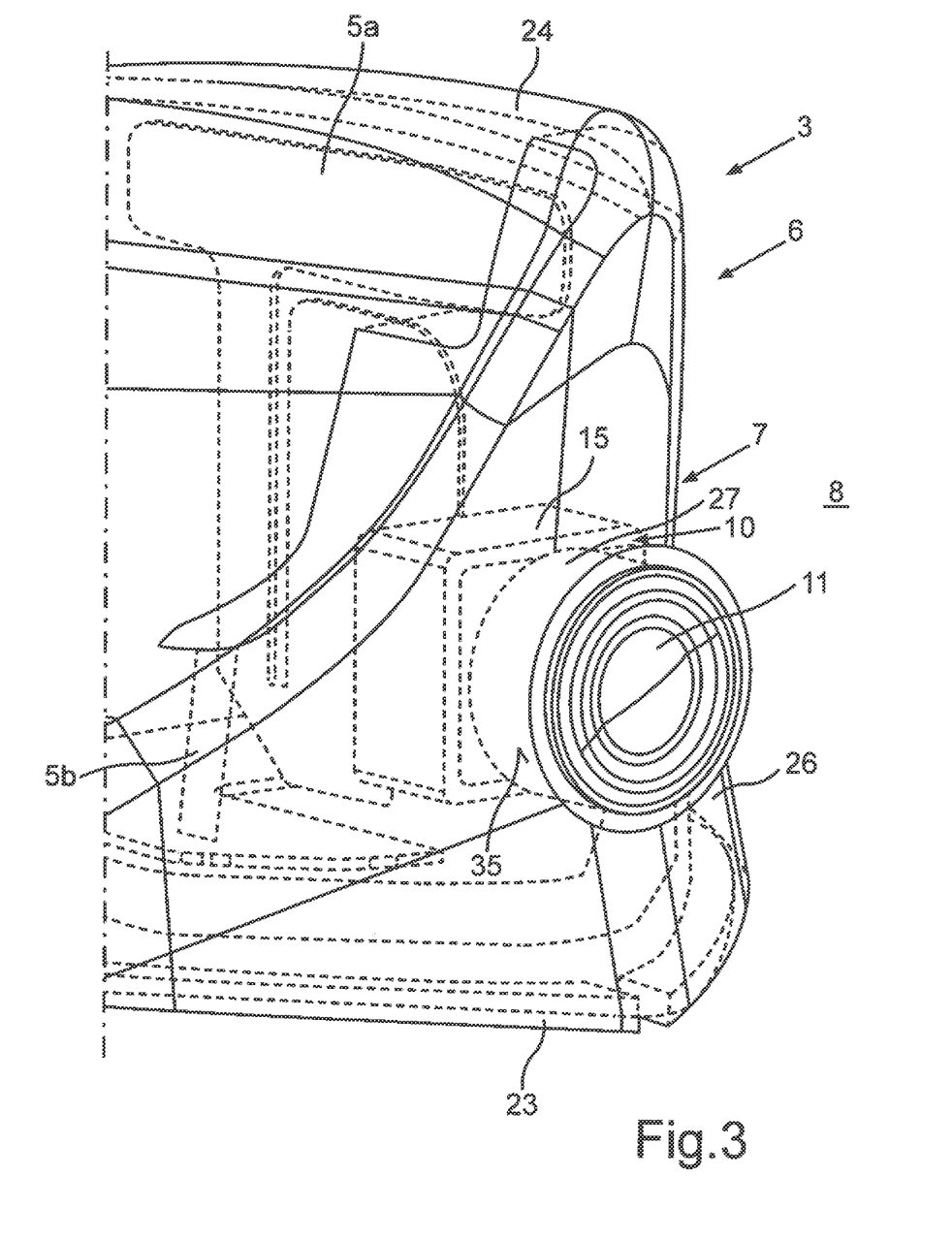
FIG. 3 a schematic illustration of an embodiment of an antenna module according to the invention.

FIG. 3 shows an embodiment of the antenna module 3. Here, the antenna module 3 has a GPS antenna 58 as well as a car-to-car communication antenna 5b as the at least one antenna 5. The antennas 5a, 5b are disposed in the interior of the antenna housing 6. Here, the antenna housing 6 has a plate-shaped pedestal 23, on which the camera 7 and the antennas 5a, 5b are disposed, in particular attached. The plate-shaped pedestal 23 can be deposed and attached on the exterior trim part 4. In addition, the antenna housing 6 has a roof-like cover 24, which is here transparently illustrated. The roof-like cover 24 is in particular formed in the shape of a shark fin and forms a radome for the antennas 5a, 5b.

The camera housing 15 of the camera 7 is completely disposed in the interior of the antenna housing 6. The antenna housing 6 has a passage opening 25 (see FIG. 5) in a housing wall 26, which corresponds to the camera objective 10. Since the camera objective 10 is here cylindrically formed, the passage opening 25 is here formed as a round hole in the housing wall 26. In the passage opening 25, the in particular cylindrical camera objective 10 is disposed in certain areas, wherein the lens 11 of the camera 7 faces the environmental region 8 or is formed adjoining to the environmental region 8. Therein, an in particular annular gap or a joint arises between the camera objective 10 and the housing wall 26 adjoining to the passage opening 25. In order to prevent for example moisture from the environmental region 8 from penetrating into the interior of the antenna housing 26, the gap is sealed. Thereto, a sealing element 27 is disposed in the gap such that the gap is closed and the antenna housing 6 is thereby sealed. Here, the sealing element 27 is cylindrically formed and here completely surrounds the objective tube 12 along an outer circumference of the objective tube 12. The sealing element 27 can also extend over an entire length of the objective tube 12 and thereby completely surround an outer side of the objective tube 12. The sealing element 27 is for example manufactured of an elastic material or a polymer, in particular EPDM, and pressed into the gap. Otherwise stated, the sealing element 27 is radially compressed by the objective tube 12 and the housing wall 26 adjoining to the passage opening 25.

In that the antenna housing 6 is sealed by means of the sealing element 27, the camera housing 15 does not have to be specifically sealed by for example providing a sealing element between the rear housing 16 and the front housing 17. Thus, the front housing 17 can be formed directly adjoining to the rear housing 16. The front housing 17 and the rear housing 16, thus the camera housing 15, can be formed of a shielding material, which shields the electronics in the camera housing 15 from the radiation of the antennas 5a, 5b without the shielding being interrupted for example by a sealing element between the rear housing 16 and the front housing 17.

Figure 4:
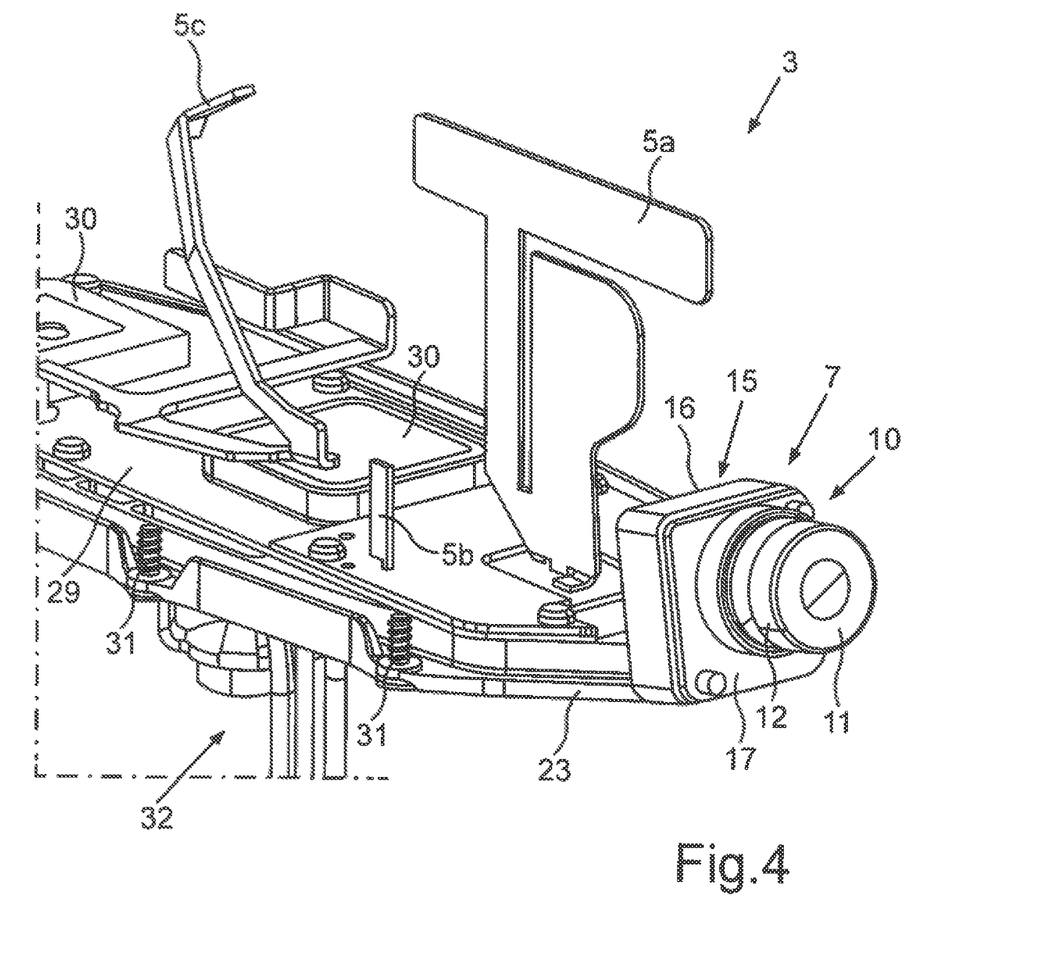
FIG. 4 a schematic illustration of an antenna module according to FIG. 3 without the cover of the antenna housing.

FIG. 4 shows the antenna module 3 without the cover 6 as well as without the sealing element 27. The camera 7 is disposed on the pedestal 23. A bearing surface 29 is on the pedestal 23, on which the GPS antenna 5a, the car-to-car communication antenna 5b, a radio antenna 5c and components 30 comprising electronics for the antennas 5a, 5b, 5c are disposed. The bearing surface 29 is here formed as a circuit board, a so-called antenna PCB (PCB—printed circuit board). The bearing surface 29 is for example connected to the pedestal 23. The pedestal 23 can be connected to the cover 24 not shown here by means of fixing elements 31, for example by screws. In addition, the antenna module 3 has an interface 32, via which the antenna PCB as well as the camera 7 can be connected to the controller of the driver assistance system 2, for example for transmitting data and/or for energy supply of the antenna PCB as well as the camera 7.

Figure 5:
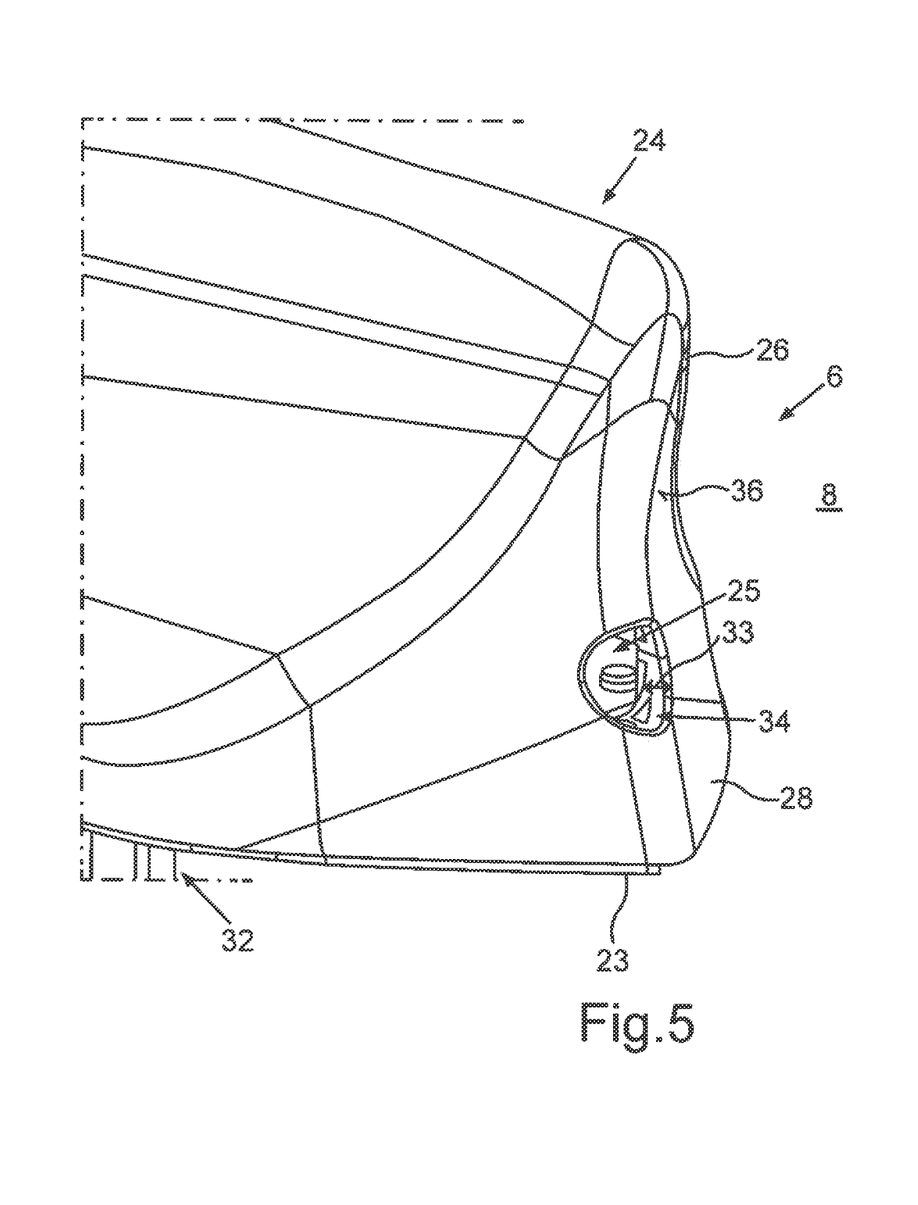
FIG. 5 a schematic illustration of the antenna housing of the antenna module according to FIG. 3.

FIG. 5 shows the antenna housing 6 with the cover 24 and the pedestal 23. An outer side 36 of the housing wall 26 faces the environmental region 8 and is formed adjoining to the environmental region 8. The passage opening 25 is disposed in a rear wall 28 of the antenna housing 6. The rear wall 28 of the antenna housing 6 faces the rearward environmental region 8 in an intended installation position of the antenna module 3 on the exterior trim part 4 of the motor vehicle 1 such that the camera 7 can capture the environmental region 8 behind the motor vehicle 1 in images.

The passage opening 25 is substantially formed as a cylindrical cavity. The housing wall 26 bounding the passage opening 25 has a predetermined wall thickness 33 thereto such that by an interface 34 between the housing opening 25 and the housing wall 26, thus by an inner side of a boundary of the cylindrical cavity, a sealing surface or a sealing area for the sealing element 27 is formed. Thereto, the housing wall 26 can for example only be reinforced in the area adjoining to the passage opening 25. Therein, the sealing element 27 in particular has a length, which at least corresponds to the wall thickness 33 such that an outer side 35 (see FIG. 3) of the sealing element 27 forms a particularly large-area overlap area with the interface 34.

Figure 6:
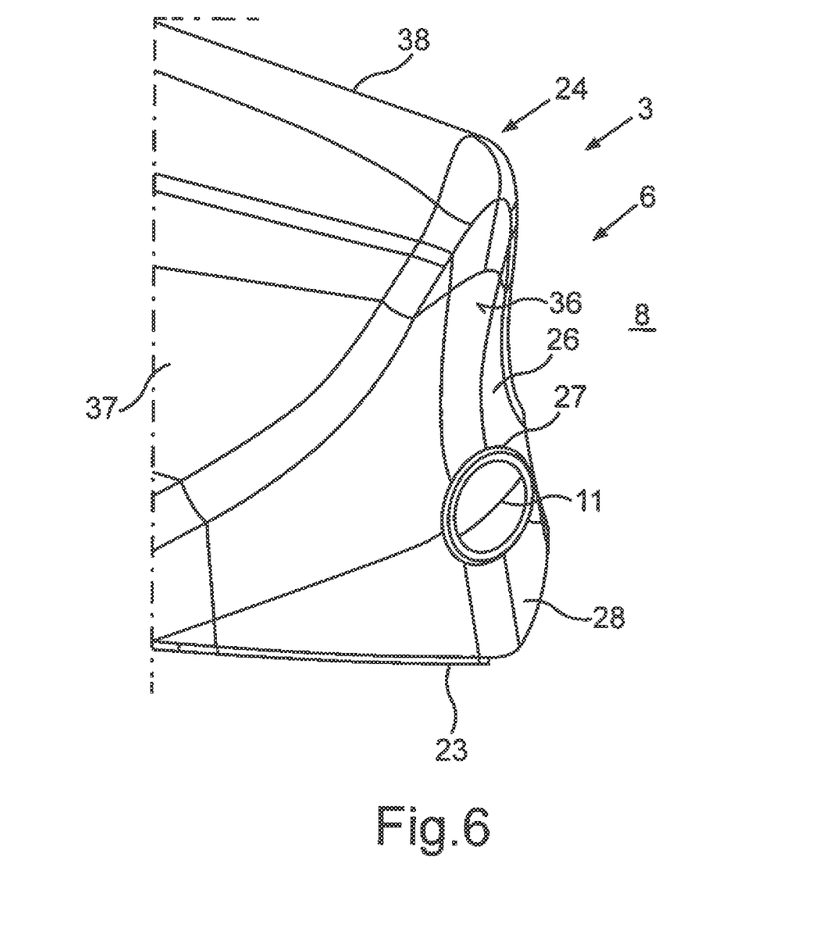
FIG. 6 a further schematic illustration of the antenna module according to FIG. 3.

FIG. 6 shows an antenna module 3 with the antenna housing 6 and the camera 7, wherein the at least one antenna 5 is completely disposed in the interior not visible here and the camera 7 is disposed in the interior in certain areas. Thus, only the outer side 36 of the housing wall 26, the lens 11 of the camera 7 as well as a front side of the sealing element 27 of the antenna module 3 are visible. The outer side 36 of the housing wall 26, the lens 11 of the camera 7 as well as the front side of the sealing element 27 are in particular flush arranged. In addition, it is shown that the antenna housing 6 is formed in the shape of a shark fin. Therein, curved sidewalls 37 of the cover 24 of the antenna housing 6 form a ridge 38 on a top side of the antenna module 3 starting from the pedestal 23. The rear wall 28 of the cover 24 is also formed adjoining to the ridge 38 starting from the pedestal 23.

The invention claimed is:

1. An antenna module for a motor vehicle comprising:
at least one antenna for an infotainment system of the motor vehicle;
an antenna housing for attaching to an exterior trim part of the motor vehicle;
a camera with a camera objective lens for capturing an environmental region of the motor vehicle,
wherein the at least one antenna is disposed in an interior of the antenna housing,
wherein the camera is disposed in the interior of the antenna housing in certain areas,
wherein the camera objective lens is disposed, from the interior of the antenna housing, in a passage opening of a housing wall of the antenna housing; and
a sealing element for sealing a gap between the housing wall adjoining to the passage opening and the camera objective lens, wherein the sealing element is pressed into the gap and comprises a front side that is visible from the exterior of the antenna housing,
wherein an exterior surface of the camera objective lens, the visible front side of the sealing element, and an exterior surface of the antenna housing are flush with each other,
wherein the camera comprises a camera housing with a rear housing for electronics of the camera and a front housing for retaining the camera objective lens, wherein the camera housing is disposed in the interior of the antenna housing,
wherein the rear housing comprises a first piece of shielding material and the front housing comprises a second piece of shielding material for shielding the electronics of the camera from radiation of the at least one antenna,
wherein the first piece of shielding material of the rear housing and the second piece of shielding material of the front housing are separate from each other prior to assembly of the antenna module, and
wherein the first piece of shielding material of the rear housing and the second piece of shielding material of the front housing are in direct contact with each other subsequent to the assembly of the antenna module, without being interrupted by a seal between the rear housing and the front housing.

2. The antenna module according to claim 1, wherein the sealing element comprises an elastic material and is pressed into the gap between the housing wall adjoining to the passage opening and the camera objective lens.

3. The antenna module according to claim 2, wherein the sealing element comprises ethylene propylene diene rubber as the elastic material.

4. The antenna module according to claim 1, wherein the sealing element is hollow cylindrically formed.

5. The antenna module according to claim 4, wherein an objective tube of the camera objective lens is disposed within the hollow cylindrical sealing element, wherein the hollow cylindrical sealing element covers the objective tube along a length of the objective tube at least in certain areas.

6. The antenna module according to claim 4, wherein the housing wall has a predetermined wall thickness at least in an area of the housing wall adjoining to the passage opening such that the passage opening is formed as a cylindrical cavity, and a length of the hollow cylindrical sealing element corresponds at least to the predetermined wall thickness of the housing wall.

7. The antenna module according to claim 1, wherein a transition between the exterior surface of the antenna housing, the visible front side of the sealing element, and the exterior surface of the camera objective lens is substantially formed without barrier.

8. The antenna module according to claim 1, wherein the antenna housing comprises a plate-shaped pedestal for disposing on the exterior trim part and a roof-shaped cover covering the pedestal, wherein the passage opening is formed in a rear wall of the cover.

9. The antenna module according to claim 1, wherein the antenna module is formed as a shark fin antenna module.

10. A driver assistance system for a motor vehicle with an antenna module according to claim 1.

11. A motor vehicle with a driver assistance system according to claim 10.

12. The motor vehicle according to claim 11, wherein the motor vehicle is formed without rearview mirrors.

13. The motor vehicle according to claim 11, wherein the antenna module is disposed on a roof of the motor vehicle.

* * * * *